United States Patent
Denecky

[11] 4,033,062
[45] July 5, 1977

[54] FISHING JIGS

[76] Inventor: Nick Denecky, 302 23 St. South, Lethbridge, Alberta, Canada

[22] Filed: Dec. 23, 1975

[21] Appl. No.: 643,828

[52] U.S. Cl. .................. 43/15; 43/19.2; 43/21.2
[51] Int. Cl.² ........................ A01K 97/10
[58] Field of Search ........... 43/15, 16, 17, 21.2, 43/19.2, 4

[56] References Cited
UNITED STATES PATENTS

| | | | |
|---|---|---|---|
| 2,663,962 | 12/1953 | King | 43/17 |
| 2,689,426 | 9/1954 | Baenen | 43/15 |
| 2,773,326 | 12/1956 | Calvert | 43/16 |
| 2,934,849 | 5/1960 | Kampa | 43/21.2 |
| 3,603,017 | 9/1971 | Happe | 43/21.2 |

*Primary Examiner*—Warner H. Camp
*Attorney, Agent, or Firm*—Scrivener, Parker, Scrivener & Clarke

[57] ABSTRACT

A fishing jig is provided which includes a fishing rod rockable by the wind to jiggle bait and attract fish. The rod includes automatic hook setting mechanism triggered by the pull of a fish on the bait and stop means are engageable by the rod after being moved a predetermined distance in one direction by a fish to provide a reaction for triggering the hook setting mechanism.

7 Claims, 4 Drawing Figures

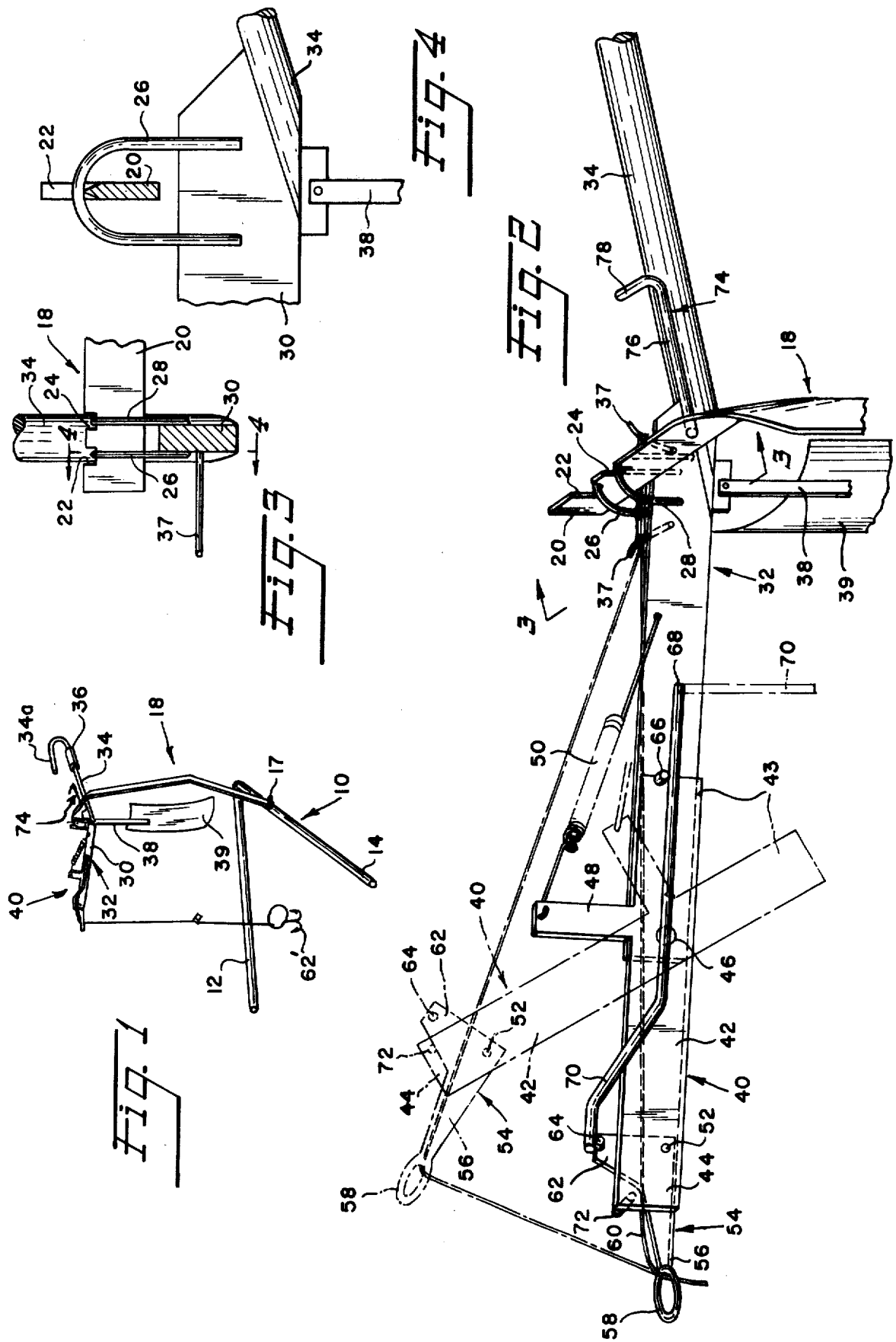

FISHING JIGS

This invention relates to rocking type fishing jigs particularly though not exclusively adapted for fishing through ice.

Rocking type fishing jigs of the type where a balanced arm is fulcrumed about a pivot to automatically raise and lower bait to attract fish are known and it is known to power rocking type jigs by wind acting on vanes attached to the jig. A problem with such jigs is that when a fish strikes, the jig is merely rocked about its pivot and provides no reaction except inertia against the pull of the fish to set the hook and thus much bait is wasted. Further even if a reaction were provided as by a fixed stop for the jig this would not ensure, without additional striking effort, that the hook would be properly set. Automatic hook setters which are triggered by a fish seizing the bait are known but such apparatus have not had the advantage of being capable of automatic jigging because there has heretofore been no means whereby a triggered hook setter could be combined with a rockable type jig so as to receive the advantages of both types of mechanisms.

It is an object of the present invention to provide a fishing jig which is particularly though not exclusively adapted for fishing through ice and which employs wind powdered jigging means, a triggered hook setter, and reaction means to ensure operation of the trigger means after a fish has rocked the jig to a predetermined position.

Other objects and their attendant advantages will become apparent as the following detailed description is read in conjunction with the accompanying drawings wherein:

FIG. 1 is a perspective view of the fishing jig showing the apparatus set upon its base in a position ready for use with the trigger device set;

FIG. 2 is an enlarged broken perspective view showing a portion of the rod part of the jig of FIG. 1 and, in phantom, the operation of hook setting means which may be employed with the jig of FIG. 1;

FIG. 3 is a broken cross-sectional view looking substantially in the direction of line 3—3 of FIG. 2; and FIG. 4 is a broken, cross-sectional view taken substantially on the line 4—4 of FIG. 3.

Referring now to the drawings, the jig of the invention comprises a base 10 consisting of horizontal legs 12, 14 hinged together at one end and spreadable relative to each other to define the base. Attached to one of the legs such as leg 14 by suitable nut and bolt means 17 is a collapsible standard 18 whose outer end is suitably bent so that when the standard is in its raised position of FIG. 1 and the nut and bolt means 17 tightened, the outer end of the standard defines an elevated horizontal support bar 20 extending across and positioned approximately midway between the angle defined by the legs 12, 14. Two knife edged notches 22, 24 are cut in the top of the bar 20 for rockingly supporting a pair of loops or bails 26, 28 which are fixed, as by welding, to the opposite flat sides of a tip part 30 of a fishing rod member 32 having a handle part 34 integrally connected, as by welding, to the tip part 30. The tip part may be of flat strap metal and the handle part of round rod material as shown though the precise configuration of the members may vary.

Slidably carried by the handle part 32 is a weight 36 which can be adjusted along the handle to balance different weights of bait on the hook. Connected to one side of the tip part 30 are a pair of oppositely extending horizontal horn-like members 37 around which a fishing line may be wound for storage. Rigidly depending from the fishing rod 32, preferably in substantial alignment with its balance point is a removable or collapsible arm 38 carrying relatively stiff sheet material 39 which serves as a vane designed to cause the rod to rock automatically on the knife edges of the support recesses when the vane is suitably oriented to the wind. The sheet material for the vane is preferably of stiff aluminum foil which may be rolled and unrolled along one or more edges to vary the vane area in accordance with current wind conditions. Carried at the outer end of the tip part 30 of the rod is automatic hook setting mechanism generally indicated by the numeral 40. The mechanism shown may comprise a lever 42 connected intermediate its inner and outer ends 43, 44 by a pivot pin 46 to the tip part 30 of the fishing rod. The lever 42 has an integral upstanding arm 48 and connected between the upper end of this arm and a point on the rod tip 30 is a tension spring 50 which at all times urges the lever 42 in a clockwise direction in FIG. 2.

Pivoted at 52 to the outer end 44 of the lever 40 is a bell crank 54 having a forwardly extending arm 56 carrying at its outer end a ring 58 through which fishing line 60, carrying at its outer end a hook 62' (see FIG. 1), extends from the line storage members 37. The other arm 62 of the bell crank 54 extends upwardly relative to the lever 40 and projecting therefrom is a horizontal pin 64. Adjacent the inner end 43 of the lever 42 is a second horizontal pin 66 and pivotally connected at 68 to the tip part 30 of the fishing rod is the inner end of a spring arm 70 which, when the lever 42 is moved to the solid line depressed position of FIG. 2 against the opposing force of the spring 50, is adapted to be engaged on opposite sides by the respective pins 64, 66, the pin 64 on the bell crank 54 being moved by manual rotation of the bell crank into an unstable position of equilibrium wherein the spring force of the end of arm 70 acts substantially in alignment with the bell crank pivot 52. In this position the spring arm 70 acts as a cocking mechanism to releasably retain the outer end 44 of the lever 42 in the solid line, depressed position of FIG. 2. When the spring arm 70 is in its cocking position, the bell crank 54 serves as a trigger responsive to the downwardly pull of a fish to release the cocking mechanism and enable the tension spring 50 to snap the outer end of lever 42 to the elevated phantom line position of FIG. 2 to set the hook. A second horizontal pin 72 is provided on the end of lever 42 to provide a positive limit stop for the bell crank after it has been rotated by the pull of a fish to release the spring arm 70.

In order to limit the rocking movement of the fishing rod in response to the strike of a fish and to provide a reaction enabling the hook setting mechanism to be triggered, a limit stop is provided. This may comprise an L shaped member 74 having one arm 76 rigidly fixed to the part 20 of the standard and the other arm 78 extending freely in spaced relationship above the handle part 34 of the rod as can be seen in FIG. 2.

In operation for ice fishing, the fisherman, after making a hole in the ice, sets up the support around the hole by first spreading the legs 12, 14 of the base, and then erecting the standard 18. Thereafter the loops 26, 28 of the rod are engaged over the knife edges of the standard, a suitable amount of fishing line is unwound from the holders 37, the hook is baited and dipped through the hole in the ice and the hook setting mechanism is cocked. This is done by manually depressing the lever 42 against the force of spring 50, the spring arm 70 is engaged over and under the pins 64, 66, respectively, and the bell crank is rotated to a position wherein the horizontal pin 64 is in a state of equilibrium as above explained. Next, the vane arm 38 and vane 39 are attached and finally the weight 36 is adjusted along the handle part 34 of the rod unit to balance the entire jig for easy rocking in both directions. The entire rig may then be oriented around the fishing hole relative to existing breezes so that the rod is caused to rock up and down by the breeze thereby jigging the bait up and down through the hole to attract fish.

When a fish strikes the bait, the downward pull thereon causes the rod initially to rock counter clockwise in FIG. 2 until the handle part 34 engages the arm 78 of the L-shaped stop 74. This arrests further rocking movement of the rod and provides a reaction such that continued downward pull of the fish on the line 60 cause the bell-crank to be rotated counterclockwise in FIG. 2 until the pin 64 is clear of the end of the spring rod 70 which then falls by gravity to the phantom line position to FIG. 2. At the same time the tension spring 50 snaps the lever 42 to the phantom line position of FIG. 2 to set the hook, the arm 62 of the bell crank having engaged the pin 72 to provide a positive stop for the hook during the bell crank setting process. If desired, the fisherman may easily and rapidly lift the rod off the standard merely by raising it until the loops 26, 28 clear the recesses 22, 24 and then withdraw the rod over the free end of the support bar 20, whereupon he may fight the fish by grasping a turned portion 34a of the handle part 34 as shown in FIG. 1.

Automatic hook setting mechanisms triggered by the pull of a fish are generally old and the hook setting mechanism shown and described is representative only. However, the important feature of the invention resides in the use of a wind operated rocking jig which successfully employs an automatic hook setting mechanism which is rendered operative by engagement of the fishing rod with a stop limiting the rocking movement in response to the pull of a fish.

Those skilled in the art will recognize of course, that the invention is susceptible of a wide variety of modifications and changes without, however, departing from the scope and spirit of the appended claims.

What is claimed is:
1. A fishing jig comprising:
  1. a portable support having an elevated, relatively stationary horizontal support bar,
  2. a fishing rod rockingly mounted on said bar intermediate the ends of said rod and at the approximate balance point thereof;
  3. hook setting means carried by the outer end of said rod comprising:
    a. an element pivoted to said rod and having an outer end which is spring biased to an elevated position relative to said rod;
    b. means for cocking said element so that its outer end is retained depressed relative to said rod;
    c. trigger means carried by said spring biased element for releasing said cocking means upon a downward pull on said trigger means; and
    d. means for suspending from said trigger means a fishing line with a hook thereon;
  4. and stop means carried by said support and spaced from but in the rocking path of said rod and engageable by said rod to limit rocking movement thereof in response to the pull of a fish on the hook suspended from said trigger means so as to provide a positive reaction against said pull for effecting operation of said trigger means and the consequent release of said cocking means.

2. The fishing jig of claim 1 including vane means carried by said rod for effecting automatic rocking thereof by action of the wind on said vane means.

3. The fishing jig of claim 1 including movable counterweight means carried by said rod on the side of said support bar opposite said hook setting arm.

4. The fishing jig of claim 3 wherein said support comprises a pair of horizontal legs hinged together at one end, and said support bar is carried by a standard releaseably connected at its inner end to said legs and movable between a raised and a collapsed position, said support bar being fixed at one end to the outer end of said standard and extending freely therefrom across the angle subtended by said legs when the latter are spread apart in supporting position so as to enable the rapid withdrawal of the rod from the support by movement thereof in the direction of the free end of said support bar.

5. The fishing jig of claim 4 including means for rockingly supporting said fish rod on said support bar, said means comprising upstanding loop means connected to said rod at the approximate balance point thereof and lying in a plane parallel to the axis of the rod, said support bar including upwardly opening recess means and upwardly facing knife edge means in said recess means engaged by said loop means.

6. The fishing jig of claim 5 wherein said stop means comprises an L-shaped member having one arm fixed to said support bar and the other arm extending into the rocking path of said fishing rod but spaced from said rod so as to be engagable thereby to limit the rocking movement of said rod in one direction in response to the downward pull of a fish on said hook.

7. The fishing jig of claim 5 wherein said standard is connected at one end to one of said legs and said support bar comprises a bent portion at the opposite end of said standard having one end integral with the opposite end of said standard and the other end being free thereby enabling the ready separation of said rod from said support bar by first raising said loop means from said recess means and then moving said loop means off the free end of said support bar.

* * * * *